United States Patent
Kornahrens

[15] 3,648,720
[45] Mar. 14, 1972

[54] AIRCRAFT REFUELING VEHICLE

[72] Inventor: Herman Kornahrens, East Islip, N.Y.

[73] Assignee: Garsite Products, Inc., Deer Park, N.Y.

[22] Filed: Feb. 26, 1970

[21] Appl. No.: 14,326

[52] U.S. Cl. ............................................. 137/351, 182/113
[51] Int. Cl. ................................................. B66f 9/06
[58] Field of Search .............. 137/350, 351; 187/9; 182/113

[56] References Cited

UNITED STATES PATENTS

| | | | |
|---|---|---|---|
| 2,196,511 | 4/1940 | Wagner et al. | 137/351 X |
| 2,525,074 | 10/1950 | Knight | 137/351 X |
| 2,632,530 | 3/1953 | Wagner | 187/9 |
| 2,753,224 | 7/1956 | Troche et al. | 182/113 |
| 2,787,278 | 4/1957 | Mitchell | 137/351 X |
| 2,787,343 | 4/1957 | Mitchell | 187/9 UX |
| 2,888,299 | 5/1959 | Balogh | 182/113 X |
| 2,948,306 | 8/1960 | Kuraeff | 137/351 X |
| 2,960,106 | 11/1960 | Dyer et al. | 137/351 |
| 2,997,721 | 8/1961 | Hopfeld | 137/351 X |
| 3,307,656 | 3/1967 | Susag | 187/9 |

*Primary Examiner*—Samuel Scott
*Attorney*—Philip D. Amins

[57] ABSTRACT

An aircraft refueling vehicle including means for refueling various size and height aircraft from fuel hydrants or from tanks carried by said vehicle and including an interlock switching mechanism to prevent said vehicle from being moved away from said aircraft during the refueling operation or whenever the refueling apparatus thereof is not in a stored or inactivated condition, and including an adjustable high level platform.

23 Claims, 8 Drawing Figures

INVENTOR.
HERMAN KORNAHRENS
BY
Philip D. Amino
ATTORNEY

Patented March 14, 1972

INVENTOR
HERMAN KORNAHRENS

BY Philip D. Amins

ATTORNEY

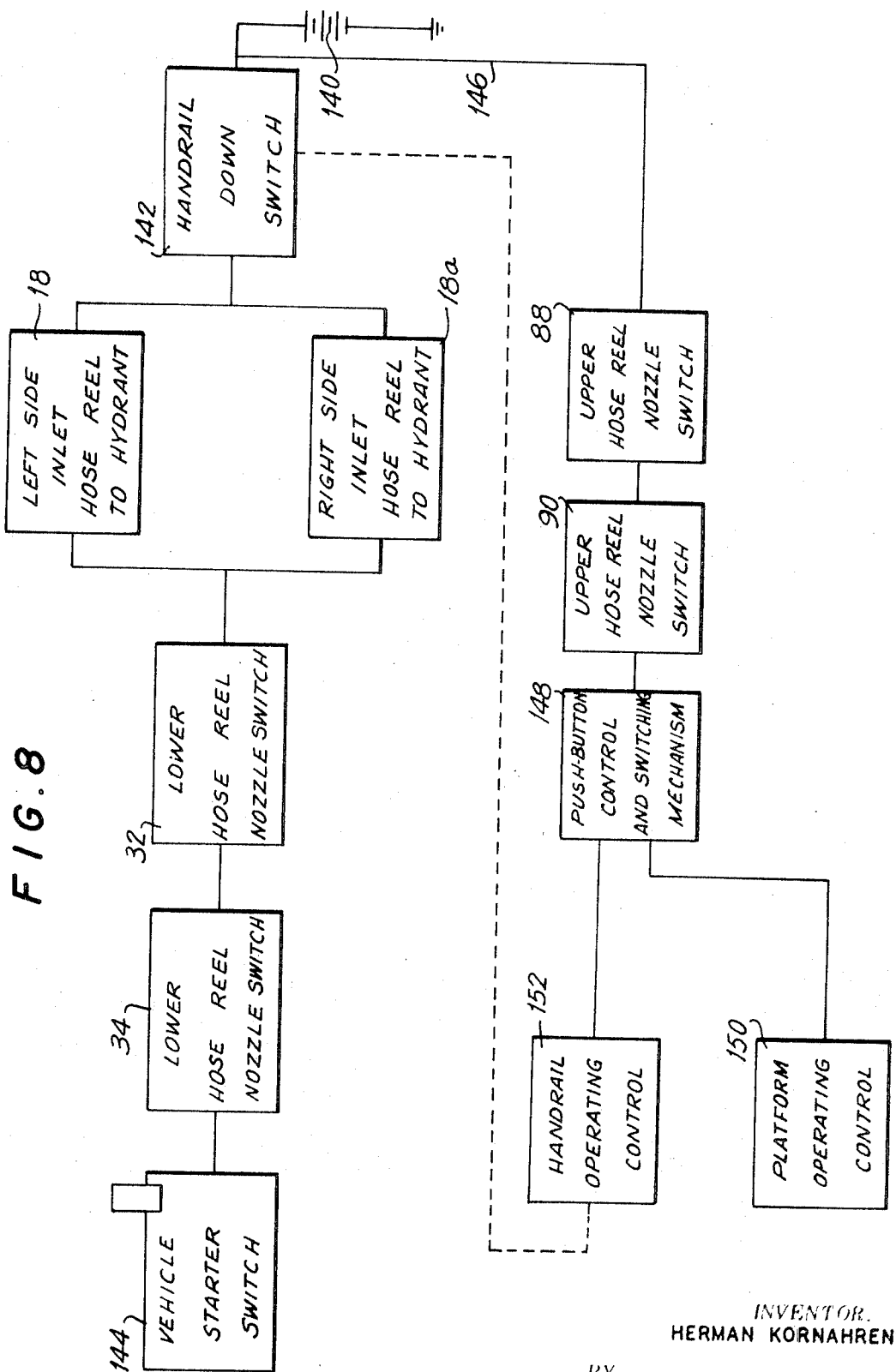

AIRCRAFT REFUELING VEHICLE

BACKGROUND OF THE INVENTION

With the advent of larger type jet aircraft than heretofore used, it has become necessary to provide new refueling vehicles therefor. The problems encountered with refueling of larger jet aircraft such as the B-747, and eventually the supersonic type aircraft, are that the fuel tanks thereof are, and will be, at a higher elevation above ground than those of the conventional type jet aircraft presently in commercial use. However, these new larger type aircraft will not completely replace the smaller present existing aircraft but will be employed together therewith. It therefore becomes desirable and expeditious to have a single type refueling vehicle which will be capable of refueling use in conjunction with present size aircraft and also with the newer and larger jet aircraft to be placed in commercial use. This new type refueling vehicle will also require a safety system to insure that the vehicle cannot be removed from its position relative to the aircraft during the refueling operation.

SUMMARY OF THE INVENTION

Accordingly, it is a primary object of the present invention to provide a new and novel aircraft refueling vehicle which can be employed with various size aircraft which have fueling ports disposed at various elevations above the ground to easily and quickly refuel the aircraft.

It is another object of the present invention to provide an aircraft refueling vehicle of the above type which is provided with a safety switching system which will prohibit movement of said vehicle once the aircraft refueling operation has commenced and will remain operative until the refueling has been completed and the refueling apparatus returned to its stored or inactivated condition.

It is a further object of the present invention to provide an aircraft refueling vehicle of the aforesaid type wherein the safety switching system controls the vehicle driving mechanism.

It is yet another object of the present invention to provide a safety switching system of the aforesaid type which controls the electrical portion of the vehicle driving mechanism.

It is yet another object of the present invention to provide an aircraft refueling vehicle having refueling apparatus whose elevational height is adjustable to permit refueling aircraft of various sizes whose fueling ports are at different elevations above the ground.

It is still a further object of the present invention to provide an aircraft refueling vehicle of the aforesaid type having a vertically moveable adjustable platform having refueling apparatus mounted thereon and moveable therewith and the platform having a hand rail operatively associated therewith.

It is still a further object of the present invention to provide an aircraft refueling vehicle of the aforesaid type which is particularly intended for use as a hydrant servicer in conjunction with externally positioned underground fuel storage tanks.

BRIEF DESCRIPTION OF THE DRAWINGS

The foregoing and other objects, features and advantages of the present invention will become more apparent from the detailed description to follow hereinafter when considered in conjunction with the accompanying drawings wherein:

FIG. 8 is a block diagram of the electrical system employed to prohibit movement of the vehicle during refueling operation of the aircraft.

DESCRIPTION OF THE PREFERRED EMBODIMENT

Figure 1:
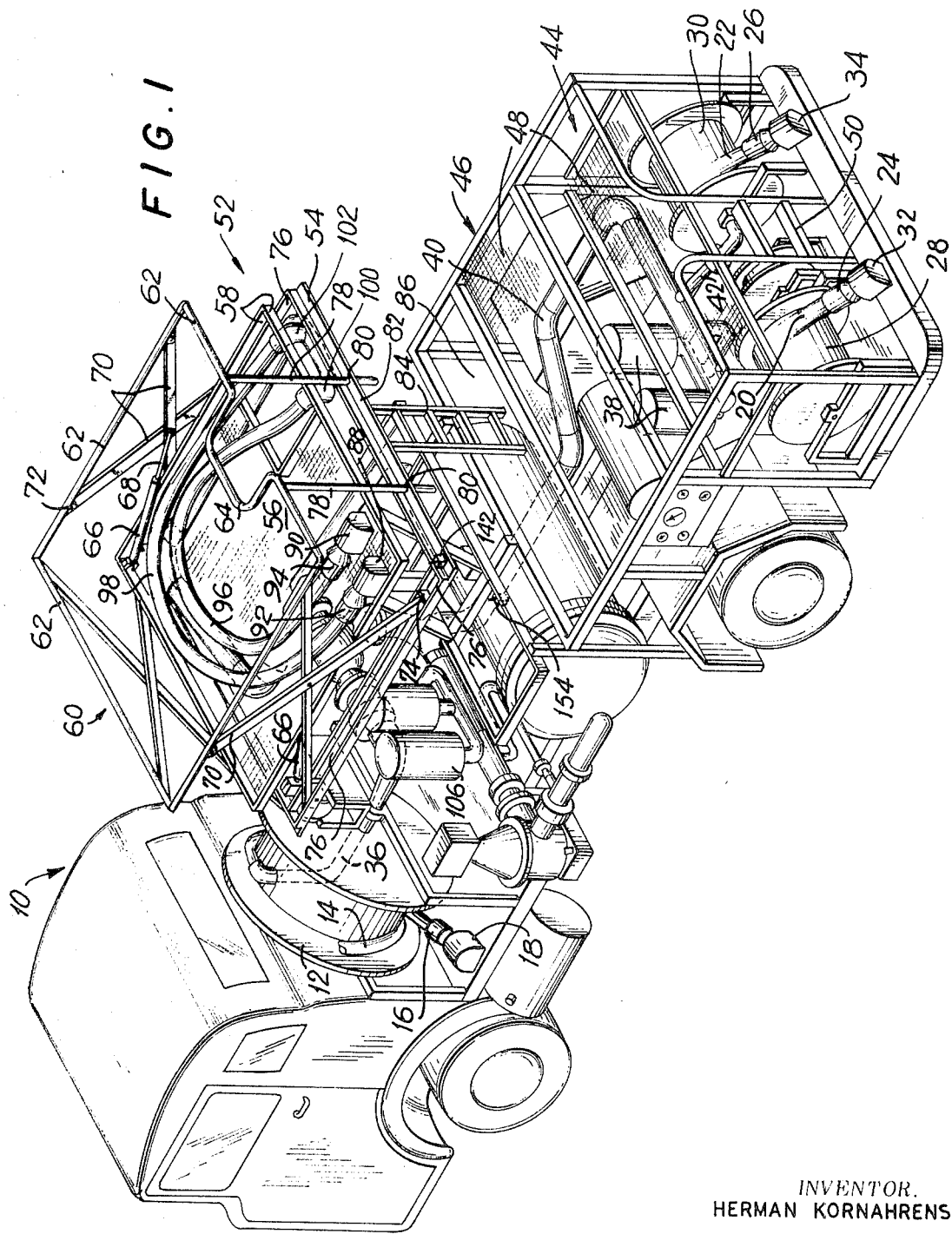
FIG. 1 is a perspective view of the novel aircraft refueling vehicle of the present invention.

Referring now to the drawings and, more particularly to FIG. 1 thereof, there is shown an aircraft refueling vehicle generally denoted by the reference numeral 10 and constructed in accordance with the principles of the present invention. The vehicle 10 includes a reel 12 having an inlet hose 14 and coupler or nozzle 16 wound thereon. The nozzle 16 is adapted to be connected to an external hydrant when the vehicle is in its operative servicing condition. When the vehicle is not in use the nozzle 16 is positionally secured within an interlock storage compartment 18 whose structure is shown in detail in FIG. 6 and which will be described in detail hereinafter.

It is to be noted that an interlock storage compartment 18 is disposed on either side of the vehicle at the front portion thereof. The purpose of providing two such compartments is to permit the vehicle to be used from either side thereof; i.e., the vehicle may be parked either to the left or right of an external hydrant and upon completion of the refueling operation the nozzle 16 is positioned in the storage compartment 18 on that particular side of the vehicle adjacent the hydrant.

The rear of the vehicle is provided with outlet or discharge hoses 20 and 22 having nozzles 24 and 26 connected thereon and wound upon outlet reels 28 and 30, respectively. The nozzles 24 and 26 are stored, when not in use, in interlock storage compartments 32 and 34, respectively. The structural features of storage compartments 32 and 34 are shown in detail in FIG. 6 and will be described more fully hereinafter.

The hoses 20 and 22 and their corresponding nozzles 24 and 26 are used for refueling aircraft whose fuel tanks are positioned relatively close to ground level or the large commercial jet aircraft when long hoses are needed.

The fuel entering the refueling system of vehicle 10 passes through hose 14 and passes through a conduit 36 positioned within the reel 12 (shown by dotted lines in FIG. 1) and thence through conduit 37 and via accumulators 38 such as the type known as Surgite surge suppressors, manufactured by the assignee of the present invention, and through other pressure, filtering and flow regulating devices, as illustrated herein, but not, per se, forming part of the present invention, to a conduit 40 which is, in turn, connected in fluid flow communication with an output conduit 42 which passes the fuel to the discharge hoses 20 and 22.

The rear portion of vehicle 10 includes low level platforms 44 and 46 which are fabricated of steel gratings 48. Access to the platforms 44 and 46 are provided by means of a ladder 50.

Figure 4:
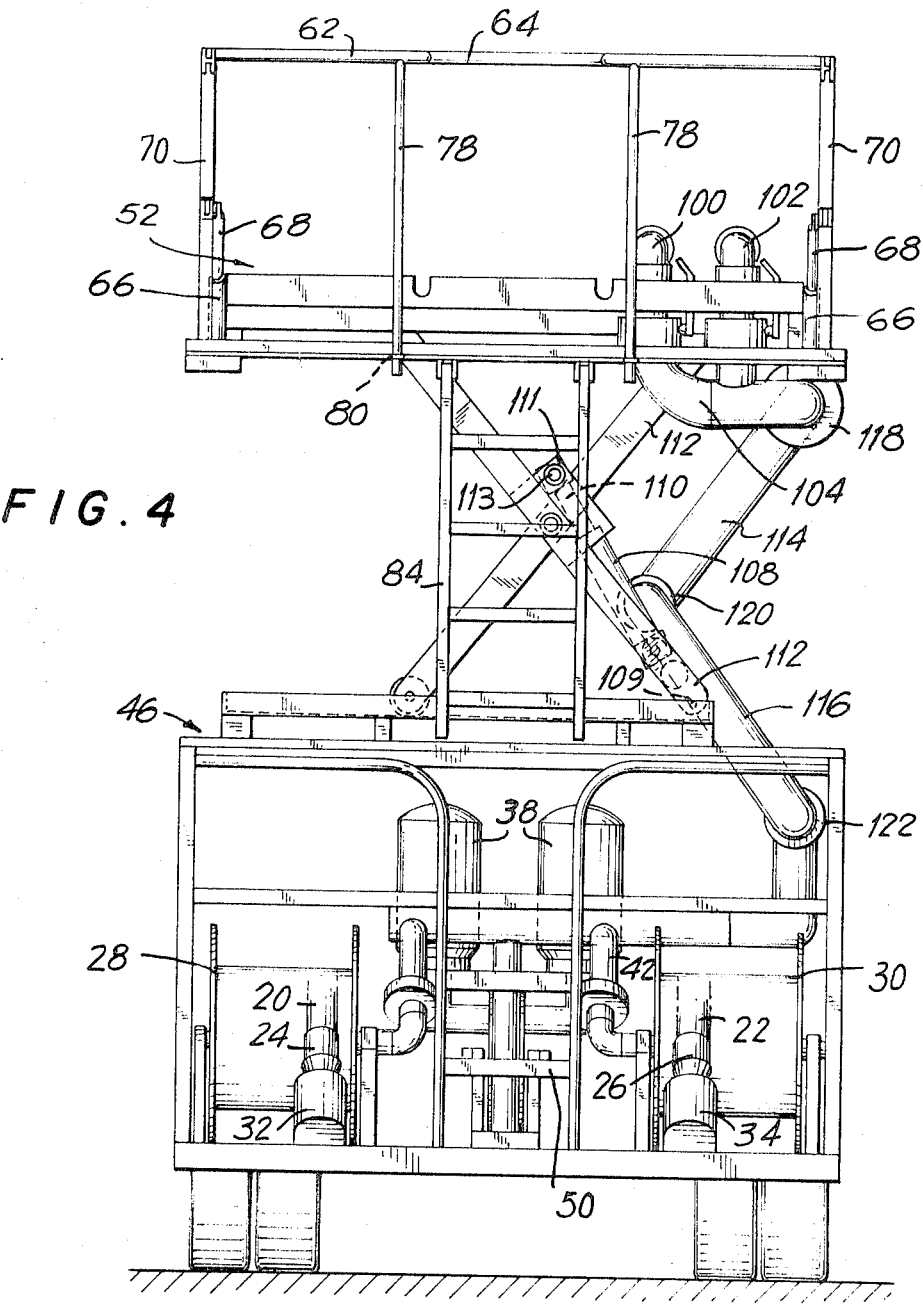
FIG. 4 is an end view of the aircraft refueling vehicle taken on the line 4—4 of FIG. 2, with the hand rail and platform in an elevated position.

The central portion of the vehicle includes a vertically adjustable high level platform generally indicated by the reference numeral 52. The platform 52 includes an outer housing member 54 of substantially square configuration but which may also be rectangular. Positioned slightly above the member 54 and secured thereto is the high level deck 56 which is preferably in the form of a steel grating. The barlike edges 58 of the platform 56 are recessed with respect to the housing member 54. The platform also includes a handrail assembly 60 comprising four connected rod members 62, one of which has an inwardly extending central portion 64 whose purpose will be described hereinafter. The handrail assembly 60 is alternately extensible and collapsible being hydraulically controllable by means of piston cylinder 66 and piston rod 68 assemblies. Three of the rod members 62 are held in retracted and extended position by means of cross-bars 70, pairs of which operate in conjunction with one another. The upper ends of the cross-bars 70 are hingedly secured to the underside of the rod members 62 as at 72, for pivotal movement with respect thereto. The lower ends of the cross-bars 70 terminate in flange members 74 mounted for slidable movement within a slot 76 formed in three sides of the housing member 54. The fourth one of the rod members 62, which includes the inwardly extending central portion 64, has a pair of vertically depending rods 78 secured to the underside of said portion 64. The rods 78 project through openings 80 in the lateral flange portion 82 of the housing member 54 and are vertically movable therein and supported against lateral movement thereby. The lower ends of rods 78 project below the flange 82 when the platform 52 has been moved to its uppermost elevation, as best seen in FIG. 4. The housing member 54 also has a ladder 84 secured to the underside thereof and depending vertically therefrom. The ladder 84 is movable in conjunction with the platform 52 and is adapted for vertical movement within the well 86 disposed rearwardly of the platform 46.

Figure 2:
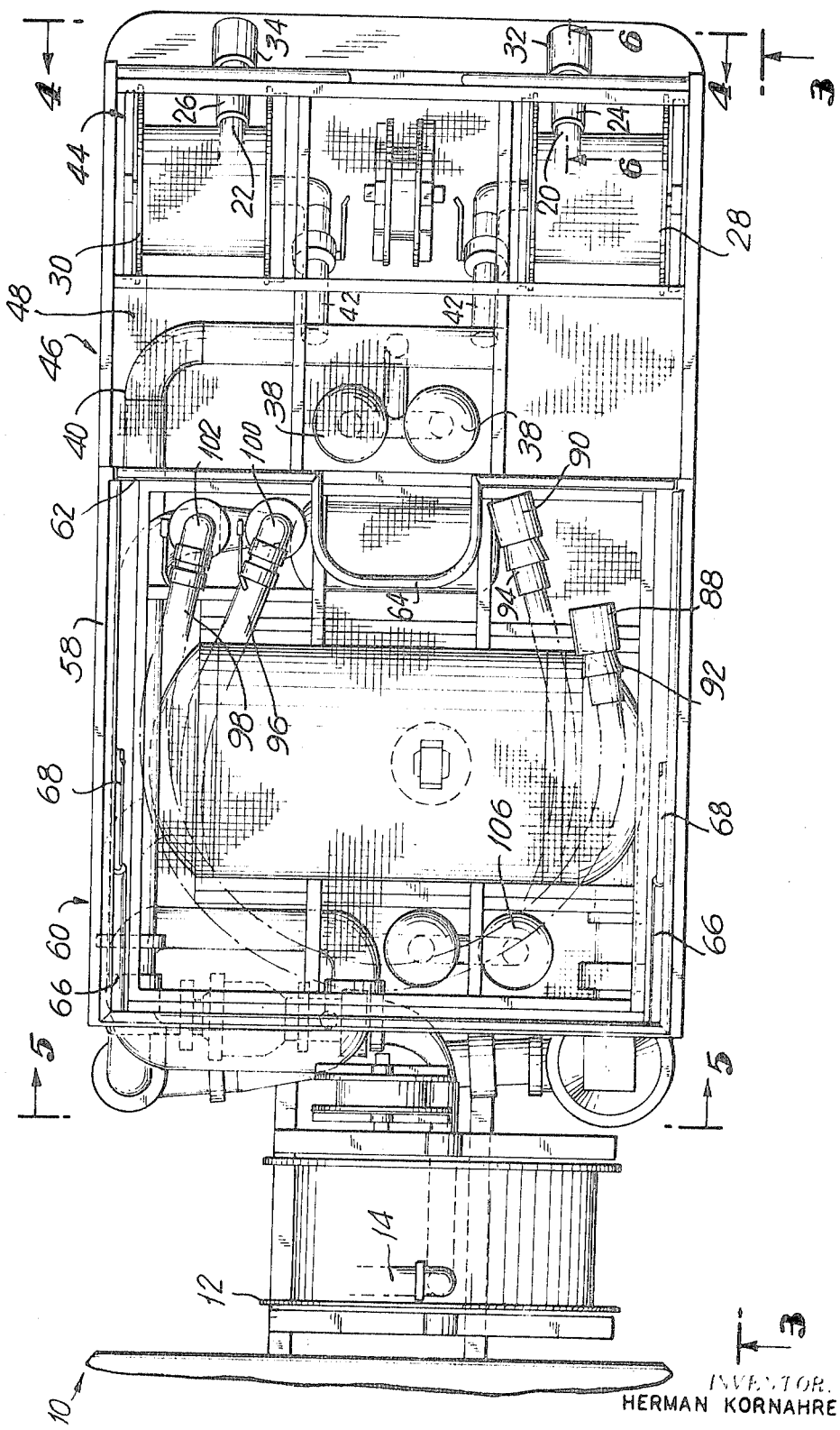
FIG. 2 is a partial top plan view of the aircraft refueling vehicle depicted in FIG. 1.
Figure 3:
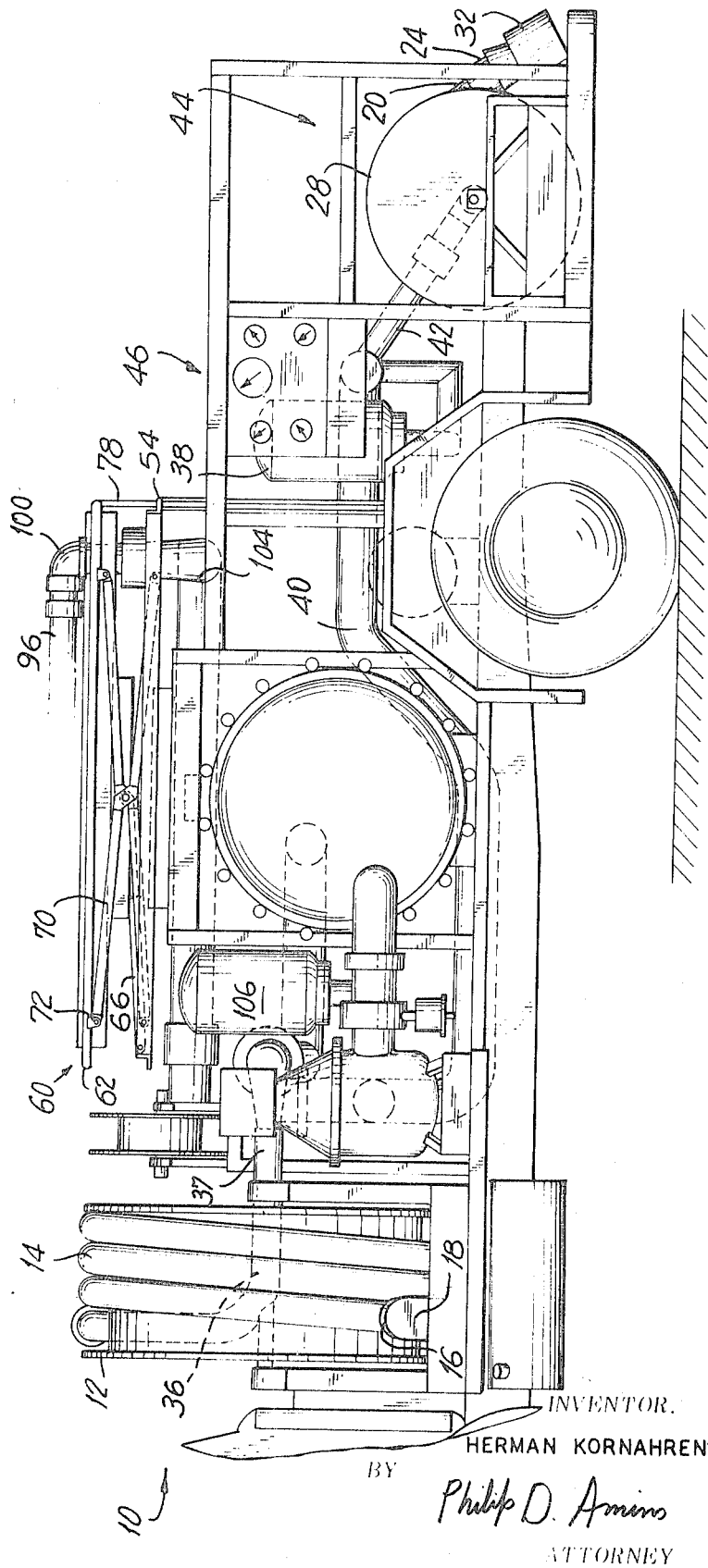
FIG. 3 is a partial side elevational view of the aircraft refueling vehicle depicted in FIG. 1.

As best seen in FIGS. 1 and 2, mounted on one side of the rear portion of the deck 56 are interlock storage compartments 88 and 90 which house nozzles 92 and 94, respectively. The nozzles 92 and 94 are connected at one end of hoses 96 and 98, the other ends of which are connected to right angle or elbow conduit members 100 and 102, respectively. The elbow conduits 100 and 102 are connected to a common conduit 104 (as best seen in FIG. 4) which is in turn connected via a plurality of pivotable conduits, as will be explained in detail hereinafter, and other conduits and couplings to the fuel conduit 36. It is to be noted this fluid coupling arrangement includes the surge suppressors 106 which aids in the regulation of the fuel pressure within the conduit system.

The high level platform assembly 52 is vertically adjustable by means of a pair of hydraulic cylinders 108 and associated pistons 110. The cylinders are pivotally secured to the vehicle chassis as at 109, as best seen in FIG. 4. The remote ends of the pistons are secured to a rod member 111 which is interconnected between horizontally spaced cross-bar support members 112, as at 113. The rod member 111 is pivotally connected at its ends 113 to the cross-bar members 112 so that the rod member is rotatable about its horizontally disposed longitudinal axis.

Figure 5:
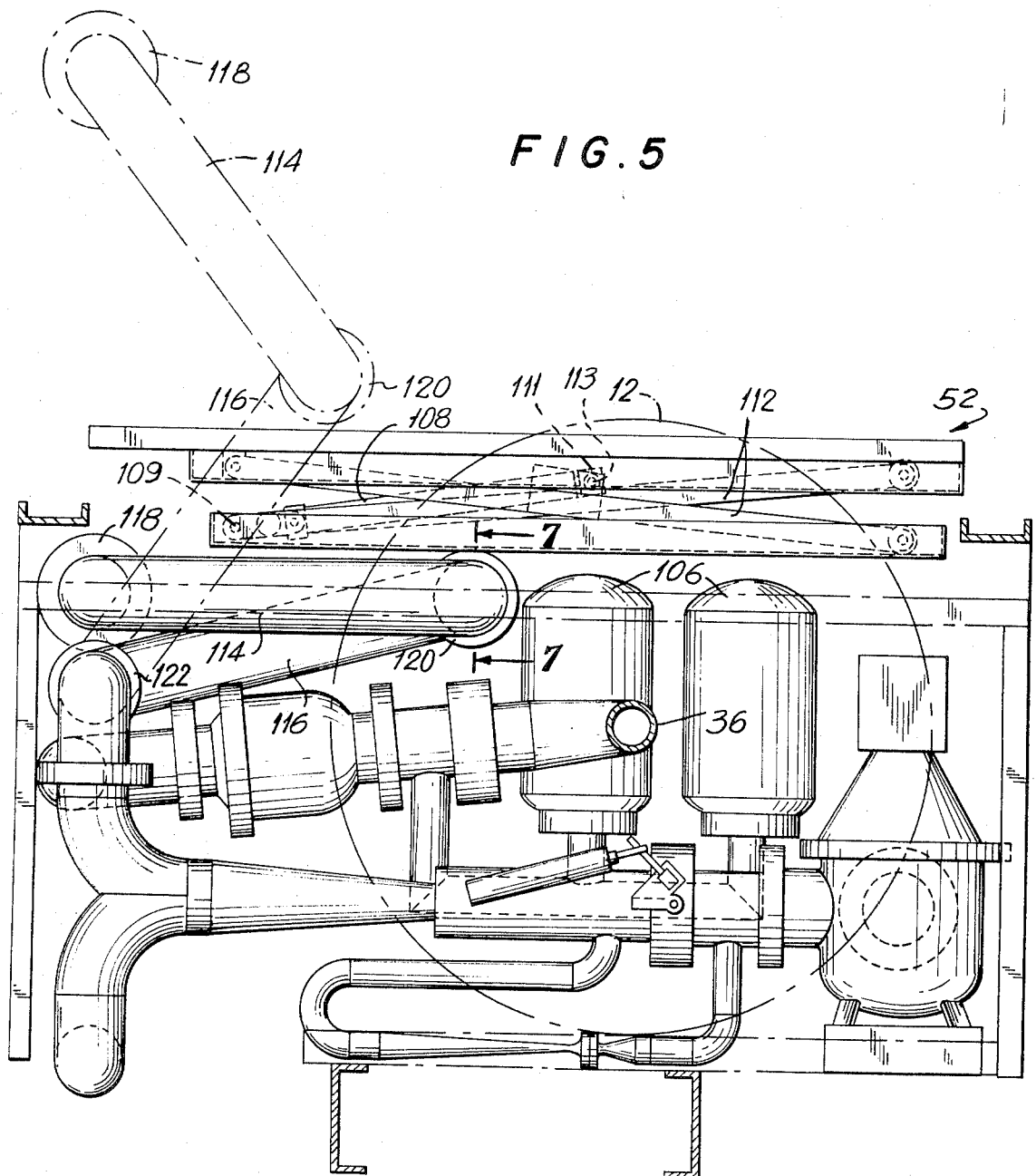
FIG. 5 is a front sectional view taken on the line 5—5 of FIG. 2.

The flow of fuel from the conduit 36 through the fluid coupling assembly to the conduit 104 and then to the elbows 100 and 102 is accomplished by means of pivotable conduit members 114 and 116 whose ends are pivotally connected to three swivel or swing joints 118, 120 and 122, as shown in FIGS. 4 and 5. The inner ends of conduits 114 and 116 are connected in fluid flow communication to the swivel joint 120 while the outer end of conduits 114 and 116 are connected to the swivel joints 118 and 122, respectively.

Figure 7:
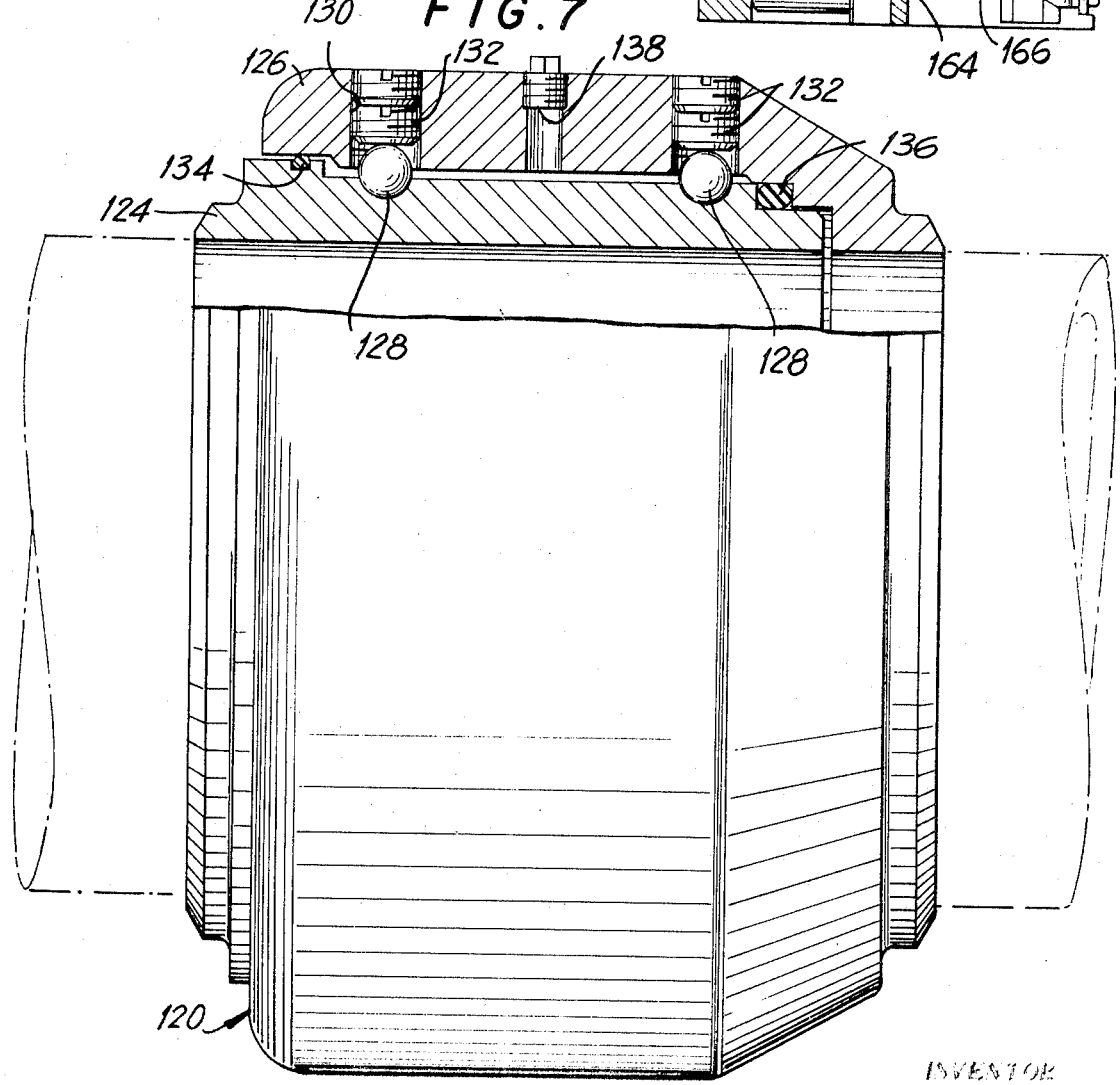
FIG. 7 is a sectional view of the pipe swing joint assembly taken on the line 7—7 of FIG. 5.

The swivel joints 118, 120 and 122 are all of similar construction and a detailed view of the swivel joint 120 is shown in FIG. 7. The swivel joint 120 includes an inner race 124 and an outer race 126 having two rows of ball bearings 128 interposed therebetween in spaced apart relationship. The outer race 126 is provided with bores 130 having pairs of screws 132 recessed therewithin which screws close the bores 130 after the placement of the ball bearings 128 therein. The swivel joint also includes O-rings 134 and 136 for sealing engagement between said inner and outer races. The outer race 126 is also provided with a removable plug 138 to permit proper lubrication of the ball bearings 128.

The swivel joint 122 is fixed with respect to the vehicle chassis and is neither vertically or horizontally movable. This joint merely permits for pivotal movement of the conduit 116 with respect thereto. The swivel joint 118 is fixed with respect to the high level platform 52 and is vertically movable in conjunction therewith. The swivel joint 120 is free and is adaptable for both vertical and horizontal movement as will be apparent from the following description, with reference to FIG. 5. The position of the conduits 114 and 116 and swivel joints 118, 120 and 122 in the retracted or lowered position of the high level platform 52 is shown in solid lines with joints 118 and 120 being substantially horizontally coplanar. When it is necessary to refuel an aircraft by means of the nozzles 92 and 94 on the high level platform 52, the latter is actuated, as will be described hereinafter, and is moved into its extended or raised position. When this occurs, the joint 118 moves vertically upward in conjunction with the high level platform 52 and the outer end of conduit 114 pivots with respect thereto. Concomitantly with the above, the outer end of conduit 116 pivots with respect to swivel joint 122 and the inner ends of conduits 114 and 116 pivot while the swivel joint 120 is vertically raised and horizontally traverses to the left (as viewed in FIG. 5). Thus, the final position of the various conduits and swivel joints is shown by phantom lines in FIG. 5 and in full line construction in FIG. 4.

In the operation of the vehicle 10, the same is driven to a position adjacent one side of an aircraft (not shown) preparatory to the refueling thereof. Thereafter, the nozzle 16 is removed from either the left or right interlock storage compartments 18 or 18a, and as viewed in FIG. 1, from the left storage compartment 18 and connected to an underground fuel hydrant. With particular reference to FIG. 8, when the nozzle 16 is removed from the interlock storage compartment 18, it opens the switch thereof and since no nozzle is being stored in the compartment 18a, both compartments 18 and 18a are in open circuit electrical switch operation. The battery 140 of the vehicle 10 is serially connected through a handrail down switch 142, the parallel combination of storage compartment switches 18 and 18a, the lower hose storage compartment or nozzle switch 32 and the lower hose reel nozzle switch 34 to the vehicle starter switch 144. Thus, when the switches 18 and 18a are open, as is the case when nozzle 16 is connected to the fuel hydrant, the potential of battery 140 cannot be applied to the vehicle starter switch 144 and the vehicle 10 cannot be intentionally or inadvertently moved. The battery 140 is also connected via a lead line 146 to the series combination of the upper hose nozzle switch or interlock storage compartment 88, nozzle switch 90 and a pushbutton control and switching mechanism 148. The pushbutton control and switching mechanism 148 is connected to a platform operating control 150 and to a handrail operating control 152 which is mechanically gauged to the handrail down switch 142 to control the electrical condition thereof, as will appear more fully hereinafter.

When it is necessary to employ the upper nozzles 92 and 94 to refuel an aircraft, the nozzles are maintained positioned within compartments 88 and 90 to keep them in a "switch-on" position. This permits the pushbutton control and switching mechanism 148 to be activated by battery 140. Activation of switching mechanism 148 causes activation of the handrail operating control 152 which controls the hydraulic piston cylinder 66 and piston rod 68, causing the same to move the handrail assembly 60 from a fully collapsed position to a fully extended position. Movement of the handrail assembly 60 upward from its fully collapsed position causes the front rod member 62 to also move upwardly away from the handrail down switch 142 which in a preferred embodiment of the invention is a microswitch which is mounted upon the lateral flange portion 82 of housing member 54, as best seen in FIG. 1. This causes the switch 142 to become open circuited, thereby disconnecting battery 140 from the vehicle starter switch 144.

When handrail assembly 60 is in its fully extended position, the mechanism 148 switches the signal applied thereto and applies it to the platform operating control 150 which controls the hydraulic piston cylinder 108 and piston rod 110, causing the same to move the high level platform assembly 52 from a down position to a fully extended up position or any selected position therebetween. After platform 52 has been moved upwardly to its desired height, either or both of the nozzles 92 and 94 are removed from their respective compartments 88 and 90 and connected to the aircraft refueling tanks. It will be apparent that when either of the hose reel nozzle switches 88 or 90 are open, the platform cannot be moved either up or down since the potential of battery 140 is removed from the control mechanism 148.

In the actual operation of the vehicle 10 and, more particularly the use of the high level platform assembly 52, the attendant ascends to the deck 56 of the assembly 52 via the ladder 50 and low level platforms 44 and 46 and then commences to activate the control mechanism 148 positioned on deck 56. Thus, the handrail assembly 60 is fully extended to protect the attendant from falling off prior to any activation of the deck 56 itself. As discussed hereinbefore, if either of the nozzles 92 or 94 are in use, the platform 52 cannot be moved. Thus, if the platform assembly 52 is elevated during refueling of an aircraft and it is necessary or desirable for the attendant to get down from the deck 56, he may do so by walking down the ladder 84 to the low level platform 46 and from there he can reach the ground level, as described hereinbefore.

After the aircraft has been completely refueled, the nozzles 92 and 94 are replaced in interlock storage compartments 88 and 90 and the pushbutton control and switching mechanism 148 is once more operatively connected to battery 140. The mechanism 148 is then activated to lower the high level platform assembly 52 and its deck 56. The platform 52 continues to transcend downwardly to its lowest position at which time the housing 54 activates a microswitch 154 which causes the signal from mechanism 148 to be switched from the platform operating control 150 to the handrail operating control 152, thereby causing the handrail assembly to move downwardly into its fully collapsed position, whereupon the front rod member 62 once again contacts the microswitch 142 which is the handrail down switch and closes the same to permit electrical connection between battery 140 and the vehicle starting switch 144.

It is to be noted that the pushbutton control and switching mechanism 148 may be provided with a separate button for controlling the movement of the handrail assembly 60. Thus, after activation of the microswitch 154, the separate button may be depressed to collapse the handrail assembly.

Figure 6:
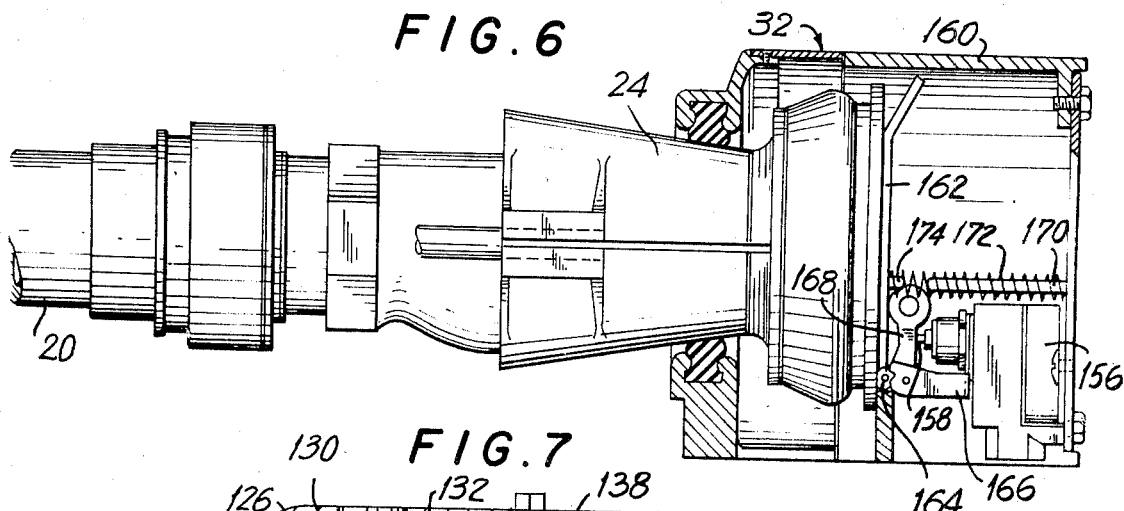
FIG. 6 is a sectional view of a hose coupling switch assembly taken on the line 6—6 of FIG. 2.

A typical storage interlock compartment or hoze reel nozzle switch assembly, such as 32, is shown in FIG. 6. The switch assembly includes a microswitch 156 having a plunger 158 disposed within a housing 160. Also mounted within housing 160 is a plate member 162, pivotally connected as at 164. A rod 166 is connected to microswitch 156 at one end thereof while the other end thereof has a lever 168 pivotally connected thereto which lever is biased outwardly away from microswitch 156 and plunger 158 by a small coil spring (not shown). The free end of lever 168 abuts the inner side of plate member 162. A spindle 170 is also mounted within housing 160 and has a helical spring 172 positioned thereon which spring is also adapted to cooperate with a boss 174 formed on plate member 162 and which extends inwardly into the housing. With nozzle 24 removed from the compartment 32, the spring 172 engages boss 174 and biases the plate member 162 outwardly of the housing 160. Similarly, the lever 168 is biased outwardly of housing 160 away from plunger 158 and in abutting engagement with plate member 162. In this position, plunger 158 is not depressed and microswitch 156 is in an open condition, whereby the nozzle switch 32 is in an open condition. When nozzle 24 is positioned within compartment 32, it first engages plate member 162 causing it to pivot about 164 and to move inwardly into housing 160 and in so doing compressing spring 172. Concomitantly therewith, plate member 162 causes lever 168 to pivot inwardly against its bias force and in so doing causes the lever to contact plunger 158 and to depress the same, whereupon microswitch 156 is closed and switch 32 is in a closed circuit position.

When the lower nozzles 24 and 26 are used to refuel an aircraft whose refueling tanks are at a sufficiently low elevation from the ground, the removal of the nozzles causes either or both of the nozzle switches 32 and 34 to be open circuited and thus prevent inadvertent energization of the vehicle starter switch 144 and removal of the vehicle 10 from its position adjacent the aircraft.

From the foregoing description, it will be readily apparent the refueling vehicle 10 cannot be moved from its parked position adjacent the aircraft until each and every one of the refueling nozzles including the inlet nozzle 16 is in its retracted stored position. Similarly, the high level platform assembly 52 and the handrail assembly 60 must also be in its collapsed or retracted position.

It is thus seen that I have provided a new and novel aircraft refueling vehicle which may include self contained fuel tanks or which may be adapted for connection to a fuel hydrant, the combination of features of which permits the refueling of various sized aircrafts and which is effective to insure that the vehicle cannot be moved from its refueling position until all the refueling apparatus has been disengaged from the aircraft. Moreover, when used in conjunction with a fueling hydrant the hydrant coupler must be returned to its normally stored position on the vehicle before the same can be moved.

It will be apparent to those skilled in the art that there are modifications, changes and improvements which may be made in the apparatus of the present invention without departing from the spirit and scope thereof.

What is claimed is:

1. In an aircraft refueling vehicle the combination comprising
   a movable platform,
   means for selectively moving said platform between a lowermost and an uppermost elevation,
   a unitary collapsible handrail assembly operatively connected to said platform,
   means for moving said handrail assembly between an extended upright position and a retracted collapsed position, and
   means for preventing movement of said platform upward from its lowermost elevation until said handrail assembly has been moved to its extended upright position and for preventing said handrail assembly from moving from its extended to its retracted collapsed position until said platform has been moved to its lowermost elevation.

2. An aircraft refueling vehicle in accordance with claim 1, including
   at least one refueling nozzle assembly operatively mounted on said platform and movable in conjunction therewith.

3. An aircraft refueling vehicle in accordance with claim 2, including
   an inlet hose and nozzle assembly adapted to be connected to a fuel hydrant, and
   means for connecting said inlet hose and nozzle assembly in fluid flow communication with said refueling nozzle assembly mounted on said platform.

4. An aircraft refueling vehicle in accordance with claim 3, wherein
   said refueling nozzle assembly includes a storage compartment, and
   said storage compartment including means operatively associated therewith to prevent operation of said selective platform moving means when the nozzle is removed therefrom.

5. An aircraft refueling vehicle in accordance with claim 3, including
   at least one second refueling nozzle assembly mounted on said vehicle and disposed at an elevation lower than the lowermost elevation of said movable platform, and
   means for connecting said second refueling nozzle assembly in fluid flow communication with said inlet hose and nozzle assembly.

6. An aircraft refueling vehicle in accordance with claim 5, wherein
   said vehicle is provided with at least one low level stationary platform disposed at an elevation higher than that of said second refueling nozzle assembly and lower than that of said first mentioned refueling nozzle assembly, and
   ladder means for ascending to said low level stationary platform.

7. An aircraft refueling vehicle in accordance with claim 6, wherein
   said movable platform is provided with a ladder operatively movable in conjunction therewith, and said ladder providing access from said low level stationary platform to said movable platform when the latter is in an elevated position.

8. An aircraft refueling vehicle in accordance with claim 7, wherein
said means for moving said movable platform comprises hydraulic actuation means.

9. An aircraft refueling vehicle in accordance with claim 3, including
first conduit means connected to said inlet hose and nozzle assembly in fluid flow communication therewith,
second conduit means connected to said refueling nozzle assembly in fluid flow communication therewith, and
means interconnected between first and second conduit means in fluid flow communication therewith to permit relative movement of said first and second conduit means with respect to one another in dependence upon movement of said platform.

10. An aircraft refueling vehicle in accordance with claim 9, wherein
said means interconnected between said first and second conduit means comprises a fluid swivel coupling.

11. An aircraft refueling vehicle in accordance with claim 10, wherein
said first conduit means includes a second fluid swivel coupling mounted on the chassis of said vehicle, and
said second conduit means includes a third fluid swivel coupling mounted on said platform and movable in conjunction therewith.

12. In an aircraft refueling vehicle having a vehicle starter switch and a source of electrical energy for energizing said starter switch, the combination comprising
a movable platform,
means for selectively moving said platform between a lowermost and an uppermost elevation,
a collapsible handrail assembly operatively connected to said platform,
means for moving said handrail assembly between an extended upright position and a retracted collapsed position,
an inlet nozzle adapted to be connected to a fuel hydrant,
at least one inlet nozzle storage compartment switch assembly positioned on said vehicle,
said inlet nozzle storage compartment switch assembly adapted to be open circuited when said nozzle is removed therefrom and to be closed circuited when said nozzle is stored therein,
switch means operatively associated with said handrail assembly and adapted to be open circuited when said handrail assembly is in its extended upright position and to be closed circuited when said handrail assembly is in its retracted collapsed position,
means for connecting said switch assembly in series with said handrail switch means, and
means for connecting said series combination in series with both said vehicle starter switch and said source of electrical energy with said source of electrical energy being connected remotely of said vehicle starter switch.

13. An aircraft refueling vehicle in accordance with claim 12, including
platform operating means,
control means for controlling the operation of said handrail moving means and said platform operating means,
said control means being operative to selectively move said platform between a lowermost and an uppermost elevation,
at least one refueling nozzle,
at least one refueling nozzle storage compartment switch assembly disposed upon said movable platform,
said refueling nozzle storage compartment switch assembly adapted to be opened circuited when said refueling nozzle is removed therefrom and to be closed circuited when said refueling nozzle is stored therein,
means for connecting said refueling nozzle storage compartment switch assembly and said control means in series, and
means for connecting said series combination in series with said source of electrical energy.

14. An aircraft refueling vehicle in accordance with claim 12, including
a first inlet nozzle storage compartment switch assembly positioned in proximity of one side of said vehicle,
a second inlet nozzle storage assembly positioned in proximity of the other side of said vehicle,
each of said first and second inlet nozzle storage compartment switch assemblies adapted to be open circuited when said nozzle is removed therefrom and to be closed circuited when said nozzle is stored therein,
means for connecting said first and second inlet nozzle switch assemblies in parallel, and
means for connecting said parallel combination in series with said handrail switch means.

15. An aircraft refueling vehicle in accordance with claim 13, wherein
said control means is operative to prevent movement of said movable platform until it has caused said handrail moving means to move said handrail assembly from its retracted collapsed position to its extended upright position and for preventing said handrail assembly from moving from its extended to its retracted position until said platform has been moved to its lowermost elevation.

16. An aircraft refueling vehicle in accordance with claim 15, wherein
said vehicle includes
at least one second refueling nozzle, and
at least one second refueling nozzle storage compartment switch assembly,
said second refueling nozzle storage compartment switch assembly being mounted on said vehicle at an elevation which is lower than said lowermost elevation of said movable platform and adapted to be open circuited when said second refueling nozzle is removed therefrom and to be closed circuited when said refueling nozzle is stored therein, and
means for connecting said second refueling nozzle switch assembly in series circuit connection with said vehicle starter switch intermediate the series connection of the latter with said electrical energy source.

17. In an aircraft refueling vehicle the combination comprising
a movable platform,
means for selectively moving said platform between a lowermost and an uppermost elevation,
a collapsible handrail assembly operatively connected to said platform,
means for moving said handrail assembly between an extended upright position and a retracted collapsed position,
means for preventing movement of said platform upward from its lowermost elevation until said handrail assembly has been moved to its extended upright position and for preventing said handrail assembly from moving from its extended to its retracted collapsed position until said platform has been moved to its lowermost elevation,
said vehicle including a starter switch, and
means connected between said handrail assembly and said vehicle starter switch to prevent energization of said starter switch until said handrail assembly has attained its retracted collapsed position.

18. In an aircraft refueling vehicle the combination comprising
a movable platform,
means for selectively moving said platform between a lowermost and an uppermost elevation,
a collapsible handrail assembly operatively connected to said platform, means for moving said handrail assembly between an extended upright position and a retracted collapsed position, means for preventing movement of said platform upward from its lowermost elevation until said handrail assembly has been moved to its extended upright position and for preventing said handrail assembly from moving from its extended to its retracted collapsed position until said platform has been moved to its lowermost elevation, and said means for moving said handrail assembly comprising hydraulic actuation means.

19. An aircraft refueling vehicle in accordance with claim 18, including means for activating said hydraulic actuation means.

20. In an aircraft refueling vehicle the combination comprising a movable platform, means for selectively moving said platform between a lowermost and an uppermost elevation, a collapsible handrail assembly operatively connected to said platform, control means for moving said handrail assembly between an extended upright position and a retracted collapsed position, said moving means being disposed remotely of said handrail assembly, and means for preventing movement of said platform upward from its lowermost elevation until said handrail assembly has been moved to its extended upright position and for preventing said handrail assembly from moving from its extended to its retracted collapsed position until said platform has been moved to its lowermost elevation.

21. In an aircraft refueling vehicle the combination comprising a movable platform, means for selectively moving said platform between a lowermost and an uppermost elevation, a collapsible handrail assembly operatively connected to said platform, control means for moving said handrail assembly between an extended upright position and a retracted collapsed position, said moving means being separate and distinct from said handrail assembly per se, and means for preventing movement of said platform upward from its lowermost elevation until said handrail assembly has been moved to its extended upright position and for preventing said handrail assembly from moving from its extended to its retracted collapsed position until said platform has been moved to its lowermost elevation.

22. In an aircraft refueling vehicle the combination comprising a movable platform, means for selectively moving said platform between a lowermost and an uppermost elevation, a collapsible handrail assembly operatively connected to said platform, means for moving said handrail assembly between an extended upright position and a retracted collapsed position, said handrail assembly having a plurality of component members and each of said component members being collapsible in a vertical plane, and means for preventing movement of said platform upward from its lowermost elevation until said handrail assembly has been moved to its extended upright position and for preventing said handrail assembly from moving from its extended to its retracted collapsed position until said platform has been moved to its lowermost elevation.

23. In an aircraft refueling vehicle the combination comprising a movable platform, means for selectively moving said platform between a lowermost and an uppermost elevation, a collapsible handrail assembly operatively connected to said platform, means for moving said handrail assembly between an extended upright position and a retracted collapsed position, and means for preventing movement of said platform upward from its lowermost elevation until said entire handrail assembly has been moved to its extended upright position and for preventing said handrail assembly from moving from its extended to its retracted collapsed position until said platform has been moved to its lowermost elevation.

* * * * *